US008283074B2

(12) United States Patent
Amine et al.

(10) Patent No.: US 8,283,074 B2
(45) Date of Patent: Oct. 9, 2012

(54) ELECTROLYTE SALTS FOR NONAQUEOUS ELECTROLYTES (75) Inventors: Khalil Amine, Oakbrook, IL (US); Zhengcheng Zhang, Naperville, IL (US); Zonghai Chen, Bolingbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1090 days.

(21) Appl. No.: 12/192,452

(22) Filed: Aug. 15, 2008

(65) Prior Publication Data

US 2010/0040954 A1    Feb. 18, 2010

(51) Int. Cl.
    *H01M 6/18*        (2006.01)
    *H01G 9/22*        (2006.01)
(52) U.S. Cl. ........ 429/326; 429/212; 429/322; 252/62.2
(58) Field of Classification Search ........................ None
    See application file for complete search history.

(56) References Cited

U.S. PATENT DOCUMENTS

| | | | |
|---|---|---|---|
| 4,201,839 A | 5/1980 | Johnson et al. | |
| 4,857,423 A | 8/1989 | Abraham et al. | |
| 5,079,109 A | 1/1992 | Takami et al. | |
| 5,296,318 A | 3/1994 | Gozdz et al. | |
| 5,429,891 A | 7/1995 | Gozdz et al. | |
| 5,763,119 A | 6/1998 | Adachi | |
| 6,004,698 A | 12/1999 | Richardson et al. | |
| 6,045,952 A | 4/2000 | Kerr et al. | |
| 6,537,697 B2 | 3/2003 | Kida et al. | |
| 7,311,993 B2 | 12/2007 | Ivanov et al. | |
| 2003/0180624 A1* | 9/2003 | Oh et al. | 429/313 |
| 2005/0221196 A1 | 10/2005 | Dahn et al. | |
| 2006/0199080 A1* | 9/2006 | Amine et al. | 429/326 |
| 2006/0263695 A1 | 11/2006 | Dahn et al. | |
| 2007/0196727 A1 | 8/2007 | Wang et al. | |

OTHER PUBLICATIONS

Xue, Zhao-Ming, Density functional theory study on lithium bis[1,2-benzenediolato(2-)-O,O'] borate and its derivatives: electronic structures, energies, and molecular properties. Aug. 7, 2004, Electrochimica Acta, vol. 49, pp. 5167-5175.*
Nanbu, Noritoshi. Lithium tris[3-fluoro-1,2-benzenediolato(2-)-O,O'] phosphate as a novel lithium salt for lithium battery electrolytes. Jul. 9, 2002. Electrochemical and Solid State Letters. vol. 5, pp. A202-A205.*
Xue, Zhao-Ming, Density functional theory study on lithium bis (1,2-benzenediolato(2-)-O,O') borate and its derivatives: electronic structures, energies, and molecular properties. Aug. 7, 2004, Electrochimica Acta, vol. 149, pp. 5167-5175.*
Nanbu, Noritoshi. Lithium tris (3-fluoro-1,2-benzenediolato(2-)-O,O') phosphate as a novel lithium salt for lithium battery electrolytes. Jul. 9, 2002, Electrochemical and Solid State Letters. vol. 5, pp. A202-A205.*

* cited by examiner

*Primary Examiner* — Ula C Ruddock
*Assistant Examiner* — Daniel Gatewood
(74) *Attorney, Agent, or Firm* — Foley & Lardner LLP

(57) ABSTRACT

Metal complex salts may be used in lithium ion batteries. Such metal complex salts not only perform as an electrolyte salt in a lithium ion batteries with high solubility and conductivity, but also can act as redox shuttles that provide overcharge protection of individual cells in a battery pack and/or as electrolyte additives to provide other mechanisms to provide overcharge protection to lithium ion batteries. The metal complex salts have at least one aromatic ring. The aromatic moiety may be reversibly oxidized/reduced at a potential slightly higher than the working potential of the positive electrode in the lithium ion battery. The metal complex salts may also be known as overcharge protection salts.

31 Claims, 3 Drawing Sheets

ELECTROLYTE SALTS FOR NONAQUEOUS ELECTROLYTES

GOVERNMENT RIGHTS

The United States Government has rights in this invention pursuant to Agreement/Award Number DE-AC02-06CH11357 between the United States Department of Energy and UChicago Argonne, LLC.

FIELD

The present invention generally relates to the electrolyte salts for use in non-aqueous electrolytes for lithium ion batteries.

BACKGROUND

High energy density and rapid charge/discharge capabilities of lithium ion batteries makes them ideal candidates for use in portable electronic devices such as cell phones, MP3 players and laptop computers. Recently, larger size lithium ion batteries have been developed and have applications for use in the hybrid vehicle (HEV) and the plug-in hybrid electric vehicle (PHEV) markets.

Lithium batteries typically comprise of a pair of electrodes and an electrolyte solution filled between them. An electrolyte solution with lithium salts dissolved in an aprotic solvent is an indispensable component in lithium battery chemistry. The availability of lithium salts for electrolyte applications is rather limited when compared to the wide spectrum of aprotic organic compounds that are available for use as electrolyte solvents. Many of such lithium salts are based on complex anions that are composed of a single anion core stabilized by a Lewis acid agent. For example, the anion of lithium hexafluorophosphate ($LiPF_6$) could be viewed as F-complexed with the Lewis acid $PF_5$.

Overcharge protection for lithium ion batteries has been proposed by imparting various chemical moieties, which are designated as "redox shuttles" or "shuttles." In theory, the redox shuttle can provide an oxidizable and reducible charge-transporting species that may repeatedly transport charge between the negative and positive electrodes once the charging potential reaches higher than the working potential of the positive electrode of lithium-ion batteries. If the battery is overcharged, the battery voltage will reach the redox potential of the redox shuttle first and then activate the redox mechanism, which will proceed as the only active component to transfer the excessive charge through the battery without causing damage to the positive active material. Under such a mechanism, adverse events caused by overcharge abuse of a battery, such as battery explosion, can be mitigated or even eliminated.

Lithium batteries typically comprise of a pair of electrodes and an electrolyte solution filled between them. The electrolyte solution contains a salt as an electrolyte, which is dissolved in a non-aqueous solvent such that the salt is dissociated into cations and anions, which support ionic conduction. Electrolytes having sufficient solubility in organic solvents are presently limited to a handful of electrolyte salts, for example, $LiClO_4$, $LiPF_6$, $LiBF_4$, $Li[B(C_2O_4)_2]$ (LiBOB), $Li[BF_2(C_2O_4)]$ (LiDfOB), $LiAsF_6$, $LiN(SO_2CF_3)_2$, $LiN(SO_2(C_2F_5))_2$, $LiN(SO_2CF_3)(SO_2C_4F_9)$, and $Li[SO_3CF_3]$. All the above salts provide a single functionality, i.e. that of an ion source for the electrolytes.

SUMMARY

In one aspect, an electrolyte is provided. In some embodiments, the electrolyte includes an aprotic solvent and a metal complex salt, where the electrolyte is non-aqueous and an anion of the metal complex salt comprises an aromatic moiety. In some embodiments, the metal complex salt is a lithium salt. In other embodiments, the metal complex salt exhibits a reversible oxidation/reduction reaction at a potential from about 3 V and 5.5 V. In still other embodiments, the potential is from about 3.9 V and 4.8 V.

In one embodiment the metal complex salt is a complex of Formula (I), Formula (II), Formula (III), Formula IV, a diastereomer any of Formulas I, II, III, or IV, or a mixture of any two or more such compounds. The compounds of Formula I-IV are:

(Formula I)

(Formula II)

(Formula III)

(Formula IV)

In Formula I-IV, A is B or Al; A' is P or As; each Z is independently O or S; each X' is independently H, halogen, CN, $NO_2$, alkyl, or haloalkyl; M is an electrochemically stable cation; x is 1, 2, or 3; $R^5$, $R^6$, $R^7$ and $R^8$ are individually a halogen; an unsubstituted or substituted alkyl group; a unsubstituted or substituted haloalkyl group; an unsubstituted or substituted aryl group; a unsubstituted or substituted haloaryl group; a cyano group; or a nitro group; or two of $R^5$, $R^6$, $R^7$ and $R^8$, or two pairs of $R^5$, $R^6$, $R^7$ and $R^8$, join together as an aromatic group that is unsubstituted, or substituted with one or more halogens; or a group of Formula V;

(Formula V)

where $R^9$ is absent, or is a $C_1$-$C_{10}$ alkyl, $C_1$-$C_{10}$ haloalkyl, $C_6$-$C_{20}$ aryl, or $C_6$-$C_{20}$ haloaryl.

In some embodiments, the electrochemically stable cation is an alkaline earth metal ion, alkali metal ion, ammonium ion, alkyl ammonium ion, tetraalkylammonium ion, imidazolium ion, or a mixture of any two or more such ions. In some embodiments, A is B; A' is P; each X' is F; and each Z is O. In some embodiments, in Formula I, $R^5$ and $R^6$ are individually a halogen. In some embodiments, $R^5$ and $R^6$ are both F. In some embodiments, $R^7$ and $R^8$ are individually a halogen. In some embodiments, are both F. In some embodiments, $R^5$ and $R^6$, together form an group of Formula V, wherein Z is O and $R^9$ is absent, $CH_2$, CFH, or $CF_2$. In some embodiments, $R^7$ and $R^8$, together form an group of Formula V, wherein Z is O and $R^9$ is absent, $CH_2$, CFH, or $CF_2$.

In some embodiments, the metal salt complex is a complex of Formula VI, VII, VIII, a diastereomer thereof, or a mixture of any two or more thereof:

(Formula VI)

(Formula VII)

(Formula VIII)

In another aspect, an electrochemical device is provided including a positive electrode, a negative electrode and the electrolytes or gel electrolytes. In some embodiments, the positive electrode includes a spinel, an olivine, a carbon-coated olivine, $LiFePO_4$, a $Li_xM'_yM''_zPO_4$, $Li_{1+x''}Ni_\alpha Mn_\beta Co_\gamma Met'_\delta O_{2-z''}F_{z''}$, $A_{n''}B_2(XO_4)_3$, vanadium oxide, and mixtures of any two or more thereof; and M' is selected from the group consisting of V, Cr, Mg, Fe, Co, and Ni; M" is selected from group consisting of IIA, IIIA, IVA, VA, VIA and IIIB metals having an ionic radius less than the ionic radius of $Fe^{2+}$; Met' is selected from the group consisting of Mg, Zn, Al, Ga, B, Zr, and Ti; and $0 \leq x \leq 1$, $0 \leq y \leq 1$, $0 \leq z \leq 1$, $0 \leq x'' \leq 0.4$, $0 \leq \alpha \leq 1$, $0 \leq \beta \leq 1$, $0 \leq \gamma \leq 2$, $0 \leq \delta \leq 0.2$, $0 \leq z'' \leq 0.5$, and $0 \leq n'' \leq 3$.

In some embodiments, the negative electrode includes graphite, amorphous carbon, $Li_4Ti_5O_{12}$, $M_{1-x}A_xLi_{2-y}B_y Ti_{6-z}C_zO_{14-t}Q_t$, tin alloys, silicon alloys, intermetallic compounds, lithium metal, or mixtures of any two or more such materials; and M is selected from the group consisting of Ba, Sr, Ca, Mg, Pb, and Sn; $0 \leq x \leq 0.5$, $0 \leq y \leq 0.5$, $0 \leq z \leq 0.5$, $0 \leq t \leq 0.5$; each of A, B and C are independently at least one divalent, trivalent or tetravalent metal; and Q is a monovalent or divalent anion.

In some embodiments, the electrochemical device is a, wherein the device is a lithium secondary battery or a super capacitor.

DETAILED DESCRIPTION

In one aspect, metal complex salts for use in lithium ion batteries are provided. Such metal complex salts not only perform as an electrolyte salt in a lithium ion batteries with high solubility and conductivity, but also can act as redox shuttles that provide overcharge protection of individual cells in a battery pack and/or as electrolyte additives to provide other mechanisms to provide overcharge protection to lithium ion batteries. These salts are metal complex salts having at least one aromatic ring. In some embodiments, the aromatic moiety is reversibly oxidized/reduced at a potential slightly higher than the working potential of the positive electrode in the lithium ion battery. In other embodiments, the aromatic moiety is ring substituted with one or more substituents, and two or more oxygen atoms bonded to the aromatic ring. The metal complex salts may also be known as overcharge protection salts.

Metal Complex Salts

In one embodiment, the metal complex salts are those of Formula (I), Formula (II), Formula (III), or Formula IV. Formula (I), Formula (II), Formula (III), and Formula (IV) are represented as:

including stereoisomers and regioisomers thereof. Those of skill in the art will recognize that the complexes, which have an octahedral, or tetrahedral arrangement of ligands about the A or A' central atom, potentially have regioisomer, and stereoisomer analogs. For example, the octahedral complexes of Formulas II and III, are shown in a single regioisomeric representation, however, all other regioisomers are included. As an explicit example, Formula III approximates a square planar representation of Z groups about the A' central atom, however the arrangement may also approximate a "T" arrangement of Z groups around the A' central atom, or other arrangement recognized by those of skill in the art.

In the above Formulas I-IV, A is B or Al, A' is P or As, each Z is independently O or S, and each X' is independently H, halogen, CN, $NO_2$, $C_1$-$C_{10}$ alkyl groups, $C_1$-$C_{10}$ haloalkyl groups, $C_6$-$C_{20}$ aryl groups, or $C_6$-$C_{20}$ haloaryl. Also, M is an electrochemically stable cation, and x is 1, 2, or 3. In Formula I, $R^5$, $R^6$, $R^7$ and $R^8$ are individually a halogen; an unsubstituted or substituted alkyl group; an unsubstituted or substituted haloalkyl group; an unsubstituted or substituted aryl group; a unsubstituted or substituted haloaryl group; a cyano group; or a nitro group. Alternatively, two of $R^5$, $R^6$, $R^7$ and $R^8$, or two pairs of $R^5$, $R^6$, $R^7$ and $R^8$ may join together as an aromatic group such as phenyl, naphthyl, or anthracenyl, which may be unsubstituted, or substituted with one or more of halogens, CN groups, $NO_2$ groups, $C_1$-$C_{10}$ alkyl groups, $C_1$-$C_{10}$ haloalkyl groups, $C_6$-$C_{20}$ aryl groups, or $C_6$-$C_{20}$ haloaryl groups; or a group of Formula V, where $R^9$ is absent, or is a $C_1$-$C_{10}$ alkyl, $C_1$-$C_{10}$ haloalkyl, $C_6$-$C_{20}$ aryl, or $C_6$-$C_{20}$ haloaryl and each Z' is independently O or S;

In some embodiments, $R^5$ and $R^6$ and/or $R^7$ and $R^8$ are joined together directly by a single or double bond. In some embodiments, the group of Formula II is an oxalic group, a malonic group, or a fluoromalonic group. As defined herein, an oxalic group is where $R^9$ is absent and a malonic group is where $R^9$ is $C_1$. Fluoromalonic refers to a malonic group where $R^9$ is CHF or $CF_2$. In the chemical nomenclature used herein, oxaloto is a an oxalic group and malonato is a malonic group. In the group of Formula II, each Z is independently O or S. Electrochemically stable cations include, but are not limited to an alkyl ammonium ion, a tetraalkylammonium ion, or imidazolium ion. In some embodiments, when the metal complex salt is a compound of Formula I, $R^7$ is not F when $R^8$ is pentafluorophenyl, and $R^7$ is not F when $R^8$ is F.

As used herein, the halogens are F, Cl, Br, or I.

Some general structural examples where $R^5$ and $R^6$ and/or $R^7$ and $R^8$ are a group of Formula V, include, but are not limited to those of Formulas VI, VII, VIII, and IX:

(Formula VIII)

As noted above, M is an electrochemically stable cation such as an alkylammonium ion, a tetraalkylammonium ion, or imidazolium ion alkali metal, alkaline earth metal. In some embodiments, M is an alkali metal ion or alkylammonium ion. Suitable examples for M include, but are not limited to, Li, Na, K, Ca, Mg, Ba, Cs, Ag, Zn, Cu, Co, Fe, Ni, Mn, Ti, Pb, Cr, V, Ru, Y, any of the lanthanides, any of the actintides, tetrabutylammonium, tetraethylammonium, tetramethylammonium, triethylmethylammonium and other mixed alkyl ammonium compounds, triethylammonium, pyridinium, imidazolium, hydrogen, tetraethylphosphonium, tetramethylphosphonium, tetraphenylphosphonium, triphenylsulfonium, triethylsulfonium, and triphenylmethyl. In some embodiments, M is Li.

In some embodiments, the valency of the M cation is preferably 1, 2, or 3. Higher valancies tend to cause the ionic metal complexes to be difficult to dissolve in suitable solvents due to the increase in crystal lattice energy. Consequently, in the case of requiring solubility of the ionic metal complex, a valency of 1 is preferable. Similarly, the valency of the anion is also 1, 2, or 3, and is preferably 1. The variable x is the ratio of the valency of the anion to that of the cation, and it also can take the value of 1, 2, or 3.

Specific examples of overcharge protection salts of general Formula (I), where A is boron, include lithium (difluorotetrafluoro-1,2-benzenediolato)borate (LiDfIFBDB); lithium bis(tetrafluoro-1,2-benzenediolato)borate (LiBTFBDB), lithium oxalato(tetrafluoro-1,2-benzenediolato)borate (LiOTFBDB); lithium ((tetrafluoro-1,2-benezendiolato)(pentafluorophenyl)(fluoro))borate (LiTFBPFPFB); lithium (difluoromalonato)(tetrafluoro-1,2-benzenediolato)borate (LiDfMTFBDB), lithium (difluoro-4-tert-butyl-1,2-benzenediolato)borate (LiDfTBBDB); lithium bis(4-tert-butyl-1,2-benzenediolato)borate (LiBTBBDB), lithium (difluoro-4,6-bis(tert-butyl)-1,2-benzenediolato))borate (LiDfBTBBDB); and lithium bis(4,6-di(tert-butyl)-1,2-benzenediolato)borate (LiBTBBDB). Such compounds may be structurally represented as follows:

LiDfTFBDB

LiBTFBDB

LiBTFBDB

LiBTFBPFPFB

LiDfMTFBDB

LiDfTBBDB

LiBTBBDB

LiDfBTBBDB and

LiBTBBDB

Specific examples of the overcharge protection salts of general Formula (III), Formula (VI), Formula (VII), and Formula (IV) where A' is phosphorus, include, but are not limited to, the following:

and regioisomers or stereoisomers of any of the above. In such structures, each X' is individually H, halogen, CN, $NO_2$, $C_1$-$C_{10}$ alkyl groups, $C_1$-$C_{10}$ haloalkyl groups, $C_6$-$C_{20}$ aryl groups, or $C_6$-$C_{20}$ haloaryl. In some embodiments, each X' is individually a halogen atom. In some embodiments, each X' is individually F.

In another aspect, complexes of Formula X are provided:

(Formula X)

In Formula X, A is B or Al; M is an electrochemically stable cation; and x is 1, 2, or 3. In Formula X, $R^8$ is a halogen; an unsubstituted, or substituted alkyl group; a unsubstituted, or substituted haloalkyl group; an unsubstituted, or substituted aryl group, unsubstituted, or substituted haloaryl group; a cyano group; or a nitro group. In some embodiments, the compound of Formula X is a compound of Formula Xa.

(Formula Xa)

In Formula X, the boron-based group is a Lewis acid and readily complexes with other anions to form complexes of Formula I. In some embodiments, a salt, MX, is added to form complexes of Formula I, where M is a metallic cation (such as an alkali or alkaline earth metal cation) and X is a halogen. For example, where the complex of Formula X is reacted with LiF, LiTFBPFPFB is formed.

Electrolytes

In another aspect, electrolytes are provided that include the metal complex salts as an electrolyte salt, as a redox shuttle, and/or as an electrode stabilizing additive; and a polar aprotic solvent. Redox shuttles are compounds or complexes that can protect an electrochemical device such as a battery or electrochemical cell against overcharge, or to at least minimize the effects of overcharge on such devices. The aromatic moiety of the metal complex salt has at least one aromatic ring. Each aromatic ring includes four or less substituents where the aromatic moiety is phenyl, and two or more oxygen or sulfur atoms bonded to the aromatic ring. Suitable such substituents include but are not limited to halogen, alkyl, haloalkyl (e.g. fluoroalkyl), —CN, or $NO_2$. Typically, the redox shuttle additive has two, three or four oxygen atoms. Mixtures of two or more of the metal complex salts with aromatic moiety can also be used as the electrolyte salt and redox shuttle additive in lithium ion batteries. The electrolytes are substantially non-aqueous. As used herein, the phrase "substantially non-aqueous" refers to the item to which it qualifies as being free of water, or at least containing only adventitious water in environments where water may be hard to exclude.

The carriers/solvents for the electrolytes may be organic or inorganic carriers. The carriers may be aprotic. Aprotic inorganic carriers include $SO_2$, $SOCl_2$, $SO_2Cl_2$, and the like, or mixtures of any two or more such carriers. Aprotic organic solvents or carriers for the cells and batteries, generally are anhydrous. Suitable aprotic solvents or carriers for use in the electrolytes include, but are not limited to, dimethyl carbonate (DMC), ethyl methyl carbonate (EMC), diethyl carbonate (DEC), methyl propyl carbonate (MPC), ethyl propyl carbonate (EPC), ethylene carbonate (EC), propylene carbonate (PC), dipropyl carbonate (DPC), bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, methyl propionate, butyl propionate, ethyl propionate, sulfolane, 1,2-dimethoxyethane, 1,2-diethoxyethane, tetrahydrofuran, 1,3-dioxolane, 4-methyl-1,3-dioxolane dimethoxyethane, triglyme, dimethylvinylene carbonate, tetraethyleneglycol, dimethyl ether, polyethylene glycols, sulfones, and gamma-butyrolactone (GBL), vinylene carbonate, chloroethylene carbonate, methyl butyrate, ethyl butyrate, ethyl acetate, gamma-valerolactone, ethyl valerate, 2-methyl-tetrahydrofuran, 3-methyl-2-oxazolidinone, 1,3-dioxolane, 4-methyl-1,3-dioxolane, vinylethylene carbonate, 2-methyl-1,3-dioxolane, or mixtures of any two or more such materials. Typically the salts present in the electrolytes are present in an amount from 0.3 to 1.2 moles per liter of the electrolyte solution; however, smaller or larger amounts are possible.

In some embodiments, the electrolyte includes an aprotic gel polymer carrier. Suitable gel polymer carrier/solvents include, but are not limited to, polyethers, polyethylene oxides, polyimides, polyphosphazines, polyacrylonitriles, polysiloxanes, polyether grafted polysiloxanes, polypropylene oxides, polysiloxanes, sulfonated polyimides, perfluorinated membranes (Nafion™ resins), divinyl polyethylene glycols, polyethylene glycol-bis(methyl acrylates), polyethylene glycol-bis(methyl methacrylates), and mixtures of any two or more such polymeric carriers. Such polymeric carriers are also inclusive of derivatives of the materials, copolymers of the materials, crosslinked and network structures of the materials, and blends of the materials. derivatives of the foregoing, copolymers of the foregoing, cross-linked and network structures of the foregoing.

In some embodiments, the inventive electrolyte is a gel electrolyte comprising: at least one aprotic solvent; at least one lithium salt; at least one crosslinking agent; at least one monofunctional monomeric compound; and at least one radical reaction initiator. In some embodiments, the gel electrolyte can also comprise other electrode stabilization additives and other electrolyte additives. In some embodiments, suitable crosslinking agents may be represented by Formula XI:

Formula XI

In Formula XI, $R^{18}$, $R^{19}$, $R^{20}$, and $R^{21}$ are each independently hydrogen, a substituted or unsubstituted alkyl group having from 1 to 12 carbon atoms, or a substituted or unsubstituted alkenyl group having from 2 to 12 carbon atoms; and where X' is a hydrogen, methyl, or ethyl group, and n''' is an integer from 1 to 15. Monofunctional monomeric compounds may be used for the control of the crosslinking density of the gel electrolyte. Suitable monofunctional monomeric compounds include those of Formula XII:

Formula XII

In Formula XII, $R^{22}$ is an alkyl group having from 1 to 12 carbon atoms; $R^{23}$ and $R^{24}$ are each independently a hydrogen, a substituted or unsubstituted alkyl group having from 1 to 12 carbon atoms, or a substituted or unsubstituted alkenyl group having from 2 to 12 carbon atoms; X'' is hydrogen, methyl or ethyl group; and q'' is an integer from 1 to 20.

Crosslinking agents and monofunctional monomeric compounds provide a physical framework, or gel, after crosslinking to host the liquid phase. Variation of the amount of the crosslinking agent and monofunctional monomeric compound in the gel may impact the conductivity of the gel electrolyte, due to changes in viscosity. Lower viscosity gels are prepared with higher concentrations of monofunctional monomeric compound, as compared to the concentration of monofunctional monomeric compound used for higher viscosity gels. Without being bound by theory, higher viscosity gels may be expected to have lower electrochemical conductivity, while lower viscosity gels may be expected to have higher electrochemical conductivity. However, other electrochemical properties of the gel electrolyte, or an electrochemical cell prepared with the gel electrolyte, such as oxidation potential and reduction potential, are not expected to be impacted.

Polymerization of crosslinking agents and monofunctional monomeric compounds are known to those of skill in the art. For example, monofunctional monomeric compounds may be polymerized by thermal and photo initiation. Representative thermal initiators include, but are not limited to, an azo compound, a peroxide compound, bismaleimide, or a mixture of any two or more thereof. One example of an azo compound is azoisobutyronitrile. One example of a peroxide compound is benzoylperoxide. Representative photoinitiators include, but are not limited to, 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, α,α-dimethoxy-α-phenylacetophenone, 2-benzyl-2-(dimethylamino)-1-[4-(4-morpholinyl)phenyl]-1-propanone, diphenyl (2,4,6-trimethylthio)phenyl)-phosphine oxide, phosphine oxide, phenyl bis(2,4,6-trimethyl benzoyl), bis($\eta^5$-2,4-cyclopentadien-1-yl)bis[2,6-difluoro-3-(1H-pyrrol-1-yl)phenyl]titanium, iodonium (4-methylphenyl)-[4-(2-methylpropyl)phenyl]-hexafluorophosphate, or a mixture of two or more thereof. In some instances the photoinitiator is a UV initiator.

Electrochemical Cells

The electrolytes and metal complex salts are capable of use in electrochemical cells exhibiting thousands hours of overcharge tolerance. The metal complex salts of the invention have a redox potential of about 3 to about 5.5 V, and, more typically, from about 4 to about 4.6 V. Thus, in some embodiments, the ionic metal complexes typically have a redox potential of about 4 V to 5 V vs. Li⁰, or of about 4.4 V to 4.8 V vs. Li⁰, in other embodiments. Accordingly, in one aspect, the electrolytes include an alkaline metal, alkaline earth, or ammonium salt; a polar aprotic solvent; and a redox shuttle additive based on the ionic metal complex salts described above. In another aspect, the electrolytes may include a polar aprotic solvent; a redox shuttle agent of a metal complex salt; and the same metal complex salt as the electrolyte salt. In another aspect, there are provided electrochemical devices employing the electrolyte and methods of making the electrolyte.

Metal complex salts that provide overcharge protection are also referred to herein as the overcharge protection salt or salts. The electrolyte may include one or more overcharge protection salt(s). In some embodiments, the overcharge protection salts also function as electrolyte salts by creating ions for carrying current. The common features of these novel electrolyte salts are the aromatic substituents which provide overcharge protection for lithium ion batteries. More specifically, the aromatic groups in the ionic metal salts can be reversibly oxidized/reduced (redox shuttles) at a potential slightly higher than the working potential of the positive electrode in lithium-ion batteries.

In alternative embodiments, the electrolyte may also include one or more non-reversibly oxidizable salts that create ions for current carrying, and would be susceptible to overcharging without the overcharge protection salt present in the electrolyte or without the provision of some other overcharge protection means (e.g. redox shuttle additives or electronic circuits). When used with a non-reversibly oxidizable salt, the overcharge protection salt of this invention may contribute to the conductivity of the cell by creating current carrying ions. Typically, an effective amount, which may be determined experimentally, of overcharge protecting salt is added to the cell, if used alone, or if used in combination with a non-reversibly oxidizable salt in the electrolyte of the cell.

Representative, non-reversibly oxidizable salts that may be employed in the 3 to 5 volt, and particularly the 4 volt, class of cells include lithium salts, such as lithium perchlorate, lithium hexafluorophosphate, lithium hexafluoroarsenate, lithium trifluoromethylsulfonate, lithium tetrafluoroborate, lithium tetrakis(pentafluorophenyl)borate lithium bromide, lithium hexafluoroantimonate, $LiB(C_6H_5)_4$, $LiN(SO_2CF_3)_2$, $LiN(SO_2CF_2CF_3)_2$, $LiPF_3(CF_2CF_3)_3$, and lithium bis(chelato)borates such as $Li[B(C_2O_4)_2]$, lithium bis(dicarboxylic acid) borate, and $Li[BF_3(C_2F_5)]$, or mixtures of any two or more such materials.

Cyclic voltammetric techniques may be used to determine whether a salt has reversible overcharge protection (oxidation/reduction) characteristics. For example, a cyclic voltammogram of a lithium salt in a standard electrolyte solvent (e.g. EC/DMC in a 3:7 weight ratio) using a Pt working electrode vs. a lithium reference electrode an be run to determine the reversibility of the oxidation/reduction processes. For other salts and cells, other reference electrodes could be used. In some embodiments, useful salts will exhibit an oxidation current at a suitable overcharge protection potential, e.g., from 0.1 to 2 volts, or from 0.1 to 1 volt or preferably from 0.1 to 0.5 volts above the design voltage of the cell, and typically below 5 volts vs. Li. When the oxidation scan is followed by a reduction scan, the salt will show a nearly equivalent reduction current at the original oxidation potential. As stated previously, an overcharge protection salt, which has an oxidation/reduction potential less than the design voltage of the cell, can be used, but such salts can limit cell performance.

The concentration of lithium salt/redox shuttle in a polar aprotic solvent ranges from about 0.001 weight percent (wt %) to about 50 wt %, and more typically from about 0.001 wt % to about 10 wt %. In some cases, additional lithium salts are added to decrease the lithium salt/redox shuttle amount required to achieve ionic conductivity. Such additional lithium salts include, but are not limited to, $Li[B(C_2O_4)_2]$, $Li[BF_2(C_2O_4)]$, $Li[PF_2(C_2O_4)_2]$, $LiClO_4$, $LiBF_4$, $LiAsF_6$, $LiPF_6$, $Li[SO_3CF_3]$, $Li[N(CF_3SO_2)_2]$, $Li[C(CF_3SO_2)_3]$, $Li[N(SO_2C_2F_5)_2]$, lithium alkyl fluorophosphates, and mixtures of any two or more. Lithium (chelato)borates such as $Li[B(C_2O_4)_2]$ and $Li[BF_2(C_2O_4)]$, or lithium (chelato)phosphates such as $Li[PF_2(C_2O_4)_2]$ may also be used as the alkali metal salt, or as an electrode stabilizing additive. Thus, in some embodiments, the alkali metal salt may be other than $Li[B(C_2O_4)_2]$, $Li[BF_2(C_2O_4)]$, or $Li[PF_2(C_2O_4)_2]$; and the electrolyte may include, as a electrode stabilizing additive, $Li[B(C_2O_4)_2]$, $Li[BF_2(C_2O_4)]$, $Li[PF_2(C_2O_4)_2]$, or a mixture of two or more thereof, at, e.g., about 0.001 to about 10 wt %. The alkali metal salt can be present at a concentration of from about 0.5 to about 2 molar and is typically a lithium salt.

The overcharge protection salt is added to the cell, specifically to the electrolyte, in an effective amount generally sufficient to provide overcharge protection. One or more of the overcharge protection salts can be added to one or more nonreversably oxidizable salts as part of the electrolyte in a cell. In some embodiments, the overcharge protection salt may be added in a range from about 0.1 to 100%, or about 0.1 to 10%, or about 1 to 99%, or about 1 to 95%, or about 3 to 70%, or from about 10% to 30% by weight of the total salt employed in the electrolyte of the cell. When lower levels of the overcharge protection salts are employed there is a possibility that ion migration from the overcharge protection salt may be insufficient to effect a redox shuttle within the cell, and, thus, for example in a lithium ion battery, excess lithium may also migrate from the cathode, resulting in an irreversible structural change. Therefore, higher levels of overcharge protection salt may be required where the design rate of discharge and recharge of the cell is high. The level of overcharge protection salt is a design parameter for the cell.

When used as an electrolyte salt, the metal complex salt concentration in the aprotic solvent in an electrolyte is least 0.05 to about 1.2M, in some embodiments, and from about 0.1 to 1.0M in other embodiments. In yet other embodiments, the metal complex salt concentration in the aprotic solvent is from about 0.2 to 0.6M. Higher concentrations tend to become too viscous especially for the larger complexes, and hence the bulk conductivity characteristics are adversely affected. In some embodiment, the concentration of the inventive salt as redox shuttle additive is in the range between 0.01 wt % and 20 wt %, preferably between 0.1 wt % and 10 wt %, more preferably between 0.1 wt % and 5.0 wt %.

Representative conventional salts that can be used in combination with the lithium electrolyte salt in the present invention include lithium perchlorate, lithium hexafluorophosphate, lithium hexafluoroarsenate, lithium trifluoromethylsulfonate, lithium tetrafluoroborate, lithium tetrakis(pentafluorophenyl)borate lithium bromide, lithium hexafluoroantimonate, $LiB(C_6H_5)_4$, $LiN(SO_2CF_3)_2$, $LiN(SO_2CF_2CF_3)$ and lithium bis(chelato)borates such as $Li[(C_2O_4)_2B]$, $Li[BF_2(C_2O_4)]$, $LiBF_3(C_2F_5)$, $LiPF_3(CF_2CF_3)_3$, $Li[PF_2(C_2O_4)_2]$, $Li[C(CF_3SO_2)_3]$, $Li[N(SO_2C_2F_5)_2]$, or a mixture of any two or more thereof. In some embodiments, where such conventional lithium salts are used, the conventional lithium salt is added in an amount to serve as a bulk ion conductor and the metal complex salt (i.e. overcharge protection salt) is added to the electrolyte in a small amount, typically from about 0.01 wt % to 10 wt %, or from about 0.01 wt % to 5 wt %, as a redox shuttle additive and/or as a electrode stabilizing additive to protect against overcharge of the cell or battery. Thus, in some embodiments, the conventional lithium salt is added in a concentration from about 0.001 weight percent (wt %) to 50 wt %, from about 0.1 wt % to 10 wt %, or from about 0.1 wt % to 5 wt %; and the overcharge protection salt is added in a concentration less than that of the conventional lithium salt and from about 0.1 wt % to 10 wt %, or from about 0.1 wt % to 5 wt %.

In some embodiments, the non-aqueous electrolytes include an electrode stabilizing additive to protect the electrodes from degradation. See e.g., co-pending U.S. application Ser. Nos. 10/857,365, 11/279,120, and provisional application No. 60/647,361. Thus, electrolytes of the invention can include an electrode stabilizing additive that can be reduced or polymerized on the surface of a negative electrode to form a passivation film on the surface of the negative electrode. Likewise, inventive electrolytes can include an electrode stabilizing additive that can be oxidized or polymerized on the surface of the positive electrode to form a passivation film on the surface of the positive electrode. In some embodiments, electrolytes of the invention further include mixtures of the two types of electrode stabilizing additives. The additives are typically present at a concentration of about 0.001 to 8 wt %.

Electrode Stabilizing Additives

In some embodiments, an electrode stabilizing additive is a substituted or unsubstituted linear, branched or cyclic hydrocarbon comprising at least one oxygen atom and at least one aryl, alkenyl or alkynyl group. The passivating film formed from such electrode stabilizing additives may also be formed from a substituted aryl compound or a substituted or unsubstituted heteroaryl compound where the additive comprises at least one oxygen atom. Alternatively, a combination of two additives may be used. In some such embodiments, one additive is selective for forming a passivating film on the cathode to prevent leaching of metal ions and the other additive can be selective for passivating the anode surface to prevent or lessen the reduction of metal ions at the anode.

Representative electrode stabilizing additives include 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2 amino-3 vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2 vinyloxetane, 2-vinyloxy-cyclopropanone, 3-(N-vinylamino)cyclohexanone, 3,5-divinyl furoate, 3-vinylazetidin-2-one, 3 vinylaziridin 2 one, 3 vinylcyclobutanone, 3 vinylcyclopentanone, 3 vinyloxaziridine, 3 vinyloxetane, 3-vinylpyrrolidin-2-one, 4,4 divinyl-3 dioxolan 2-one, 4 vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone, or a mixture of any two or more thereof. In some embodiments the electrode stabilizing additive may be a cyclotriphosphazene that is substituted with F, alkyloxy, alkenyloxy, aryloxy, methoxy, allyloxy groups, or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)-cyclotriphosphazene, (diaryloxy)(trifluoro)(methoxy)cyclotriphosphazene compounds, or a mixture of two or more such compounds. In some embodiments, the electrode stabilizing additive is vinyl ethylene carbonate, vinyl carbonate, or 1,2-diphenyl ether, or a mixture of any two or more such compounds.

Other representative electrode stabilizing additives may include compounds with phenyl, naphthyl, anthracenyl, pyrrolyl, oxazolyl, furanyl, indolyl, carbazolyl, imidazolyl, or thiophenyl groups. For example, electrode stabilizing additives may be aryloxypyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methylpyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cyclolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methylpyrrole, naphthalene, or a mixture of any two or more such compounds.

In other embodiments, electrode stabilizing additives include substituted or unsubstituted spirocyclic hydrocarbons containing at least one oxygen atom and at least one alkenyl or alkynyl group. For example, such stabilizing additives include those having Formula XIII:

Formula XIII

In Formula XIII, $A^1$, $A^2$, $A^3$, and $A^4$ are independently O or $CR^{12}R^{13}$; provided that $A^1$ is not O when $G^1$ is O, $A^2$ is not O when $G^2$ is O, $A^3$ is not O when $G^3$ is O, and $A^4$ is not O when $G^4$ is O; $G^1$, $G^2$, $G^3$, and $G^4$ are independently O or $CR^2R^3$; provided that $G^6$ is not O when $A^1$ is O, $G^2$ is not O when $A^2$ is O, $G^3$ is not O when $A^3$ is O, and $G^4$ is not O when $A^4$ is O;

$R^{10}$ and $R^{11}$ are independently a substituted or unsubstituted divalent alkenyl or alkynyl group; and $R^{12}$ and $R^{13}$ at each occurrence are independently H, F, Cl, or a substituted or an unsubstituted alkyl, alkenyl, or alkynyl group. In some embodiments, at least one of $A^1, A^2, A^3, A^4; G^1, G^2, G^3$, or $G^4$ is O. In other embodiments, at two of $A^1, A^2, A^3, A^4; G^1, G^2, G^3$, or $G^4$ is O.

Representative examples of Formula XIII include, but are not limited to, 3,9 divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9 dimethylene-1,5,7,11-tetraoxaspiro[5.5]undecane, 3,9 diethylidene-1,5,7,11-tetraoxaspiro[5.5]undecane, or a mixture of any two or more such compounds. Furthermore, mixtures of any two or more electrode stabilizing additives may also be used in the electrolytes of the present invention.

Some of the metal complex salts have oxalato sub group in the anion. These metal salts with oxalato sub group can also used as electrode stabilizing additives to improve the life of lithium ion batteries. In some aspects, the main salt in the non-aqueous electrolyte is a conventional salt and the metal complex salt or a mixture of the metal complex salts can be added to the conventional non-aqueous electrolyte as an electrode stabilizing additive. Exemplary compounds of this type of metal salts include, but are not limited to, those of Formulas V, VI, VII, and VIII. In some embodiments, the concentration of the metal complex salts as an electrode stabilizing additive is from about 0.01 wt % to 5.0 wt %, from about 0.05 wt % to 3 wt %, in other embodiments, and from about 0.1 wt % to 2.0 wt %, in yet other embodiments.

In some embodiments, the electrode stabilizing additive is an anion receptor. In some embodiments, the anion receptor is a Lewis acid. In other embodiments, the anion receptor is a borane, a boronate, a borate, a borole, or a mixture of any two or more such compounds. In some embodiments, the anion receptor is a compound of the Formula XIV:

Formula XIV

In Formula XIV, each $R^{14}$, $R^{15}$, and $R^{16}$ is independently halogen, alkyl, aryl, halogen-substituted alkyl, halogen-substituted aryl, or $OR^{17}$; or any two of $R^{14}$, $R^{15}$, $R^{16}$ and $R^{17}$, together with the atoms to which they are attached, form a heterocyclic ring having 5-9 members, and $R^{17}$ is at each occurrence independently alkyl, aryl, halogen-substituted alkyl, or halogen-substituted aryl. In some such embodiments, $R^{14}$, $R^{15}$, and $R^{16}$ are independently halogen, alkyl, aryl, halogen-substituted alkyl, or halogen-substituted aryl; or any two of $R^{14}$, $R^{15}$, and $R^{16}$, together with the boron to which they are attached, form a heterocyclic ring having 5-9 members.

In some embodiments, the anion receptors include, but not limited to, tri(propyl)borate, tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, or a mixture of any two or more thereof. Further suitable additives include 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenyl-boronate, bis(1,1,1,3,3,3-hexafluoroisopropyl)-3,5-difluorophenylboronate, bis(1,1,1,3,3,3-hexafluoroisopropyl)pentafluorophenylboronate, or a mixture of any two or more such compounds.

In some embodiments, each anion receptor is present at a concentration of about 0.001 to about 10 wt %. In some embodiments, the electrode stabilizing additive is any of the above electrode stabilizing additives, or a mixture of any two or more such additives.

Electrodes for Electrochemical Cells

In another aspect, electrochemical cells or batteries may be prepared with the metal complex salts and electrolytes. Such electrochemical cells or batteries, may be, or contain, lithium secondary cells in the 3 volt to 5 volt range, and particularly in the 4 volt class cells. Such cells or batteries contain one or more of positive electrodes (cathode) and/or negative electrodes (anode). Such cells or batteries include primary and/or secondary batteries; and capacitors including but not limited to super-capacitors or asymmetric capacitors.

Negative electrodes, or anodes, suitable for use in electrochemical cells utilizing the ionic metal complexes and electrolytes, include a wide variety of electrodes. In some embodiments, the anode includes graphite, amorphous carbon, $Li_4Ti_5O_{12}$, tin alloys, silicon alloys, intermetallic compounds, lithium metal, or mixtures of any two or more thereof. Suitable graphitic materials including natural graphite, artificial graphite, graphitized meso-carbon microbeads, and graphite fibers, as well as any amorphous carbon materials. Any of the conventional negative electrode compositions may be used in combination with the ionic metal complexes for overcharge protection.

Positive electrodes, or cathodes, suitable for use in electrochemical cells utilizing the ionic metal complexes and electrolytes, include a wide variety of electrodes. For lithium or lithium-ion cells, typically, a lithium transition metal/main group metal composite oxide is used as the positive electrode. The cathode in such a cell may include, but is not limited to, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMet_{0.5}Mn_{1.5}O_4$, $Li_{1+x'}Mn_{2-z}Met_yO_{4-m}X'_n$, $Li_{1+x''}Ni_\alpha Mn_\beta Co_\gamma Met'_\delta O_{2-z'}F_{z''}$, $A_{n'}B_2(XO_4)_3$ (NASICON), vanadium oxide, or mixtures of any two or more such cathodic materials. In such cathodic materials, Met is Al, Mg, Ti, B, Ga, Si, Ni, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; and; $0 \leq x' \leq 0.3$, $0 \leq y' \leq 0.5$, $0 \leq z' \leq 0.5$; $0 \leq x'' \leq 0.4$, $0 \leq \alpha \leq 1$, $0 \leq \beta 1$, $0 \leq \gamma \leq 1$, $0 \leq \delta \leq 0.4$, and $0 \leq z'' \leq 0.4$; $0 \leq n' \leq 0$ and $0 \leq n'' \leq 3$. In the electrochemical cells, the cathode can include spinel, olivine, or carbon-coated olivine (see Published U.S. Patent Application No.

2004/0157126). For example, the spinel can be a spinel manganese oxide with the formula of $Li_{1+x'}Mn_{2-z'}Met'''_{y'}O_{4-m'}X'_{n'}$, wherein Met''' is Al, Mg, Ti, B, Ga, Si, Ni, or Co; X' is S or F; and wherein $0 \leq x' \leq 0.3$, $0 \leq y' \leq 0.5$, $0 \leq z' \leq 0.5$, $0 \leq m' \leq 0.5$ and $0 \leq n' \leq 0.5$. Alternatively, the cathode can comprise olivine with a formula of $Li_{1+x'}Fe_{1-z}Met''_{y}PO_{4-m}X'_{n}$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Electrochemical cells prepared with the redox shuttles described herein may additionally include a separator. The separator is typically a microporous polymer film. Examples of polymers for forming microporous films include: nylon, cellulose, nitrocellulose, polysulfone, polyacrylonitrile, polyvinylidene fluoride, polypropylene, polyethylene, polybutene, and the like. Ceramic separators may also be used. In some embodiments, the electrolyte is polymerized or gelled at the surface of the electrode and a separator is not used. In such embodiments, the cell may be assembled by stacking the cathode and the anode together.

The cell is not limited to particular shapes, and can take any appropriate shape such as cylindrical shape, a coin shape, a square, or prismatic shape. A lithium cell having a plurality of cells is also not limited to particular capacities, and can have any appropriate capacity, for example, from the amount needed for small appliances to the capacity required for hybrid electric and electric cars. The cells may further include additional overcharge protection additives such as other redox shuttle additives or electronic circuits.

DEFINITIONS

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As defined herein, a regioisomer is an isomer of a compound where the ligands, or groups within the ligands differ in spatial orientation. As defined herein, a stereoisomer has at least one chiral center.

In general, "substituted" refers to a group, as defined below (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls(oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Alkyl groups include straight chain and branched alkyl groups having from 1 to 20 carbon atoms or, in some embodiments, from 1 to 12, 1 to 8, 1 to 6, or 1 to 4 carbon atoms. Alkyl groups further include cycloalkyl groups. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. Where the term haloalkyl is used, the alkyl group is substituted with one or more halogen atoms.

Aryl groups are cyclic aromatic hydrocarbons. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-20 carbons, and in others from 6 to 14, or from 6 to 12, or even 6-10 carbon atoms in the ring portions of the groups. Where the term haloaryl is used, the aryl group is substituted with one or more halogen atoms.

As used herein, alkaline earth metal ions are Be, Mg, Ca, Sr, and Ba. As used herein, alkali metal ions are Li, Na, K, Rb, and Cs.

As used herein, ammonium refers to groups or ions having the following structure, $^+NR^aR^bR^cR^d$, where $R^a$, $R^b$, $R^c$, and $R^d$ are independently selected from H and alkyl groups. Thus, all of the $R^d$ groups may be the same or different. Alkyl ammonium refers to ammonium groups having one, two, three, or four alkyl groups, while tetralkylammonium refers to ammonium groups having four alkyl groups. Mixed alkyl ammoniums are those ammonium having two, three, or four alkyl groups where at least one of the alkyl groups is different from the other alkyl groups.

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

EXAMPLES

Example 1

Synthesis of lithium (difluorotetrafluoro-1,2-benzenediolato)borate. In a glove box having an atmosphere of a dew point of −50° C., lithium tetrafluoroborate (LiBF$_4$, 0.0468 g, 0.5 mmol) and 3,4,5,6-tetrafluoro-1,2-dihydroxybenzene (0.0911 g, 0.5 mmol) were dissolved in dry acetonitrile (3.0 ml) in a 25 ml round bottom flask. B(OSi(CH$_3$)$_3$)$_3$ (0.139 g) was then gradually added to the solution. With stirring, the solution was heated to 60° C., where the temperature was maintained for 6 h. The acetonitrile was removed by rotary evaporation. The resultant solid was then washed with diethyl ether (10 ml) and dried at 110° C. for 24 h under reduced pressure (0.2 mbar) to yield lithium (difluorotetrafluoro-1,2-benzenediolato)borate (0.092 g, 95%).

Figure 1:
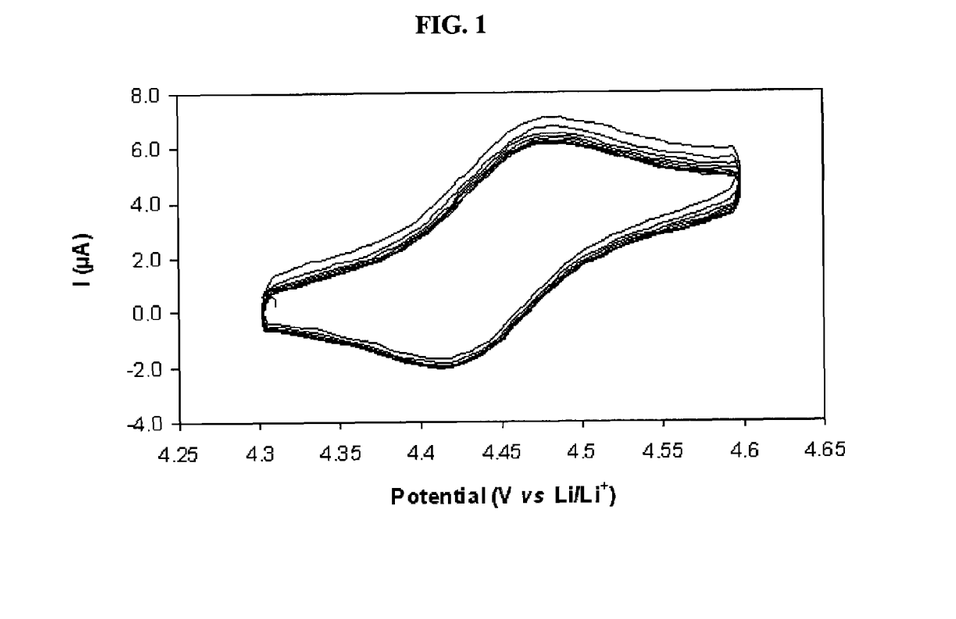
FIG. 1 is a cyclic voltammogram of 1.2 M $LiPF_6$ in EC/DEC (1:1) with 1.5 wt % lithium (difluorotetrafluoro-1,2-benzenediolato) borate (LiDfTFBDB) using a three electrode system (Pt working Electrode, Li counter electrode and Li reference electrode).

FIG. 1 shows the cyclic voltammogram of an electrolyte of 1.2 M LiPF$_6$ in EC/DEC (1:1) with 1.5 wt % lithium (difluorotetrafluoro-1,2-benzenediolato)borate using a three electrode system. One pair of reversible peaks shows up at about 4.42-4.48 V vs. Li. It is well known that the main electrolyte components (EC, PC, DMC, and LiPF$_6$) are electrochemically stable up to 4.8 V vs. Li or higher. The reversible electrochemical reaction at 4.42-4.48 V vs. Li is therefore assigned to the redox reaction of the exemplary salt. Its high reversibility makes it promising as a redox shuttle for overcharge protection of lithium-ion batteries. Moreover, the redox potential of lithium (difluorotetrafluoro-1,2-benzenediolato) borate (4.42 V vs. Li) is high enough to protect all the state-of-art positive electrode materials for lithium-ion batteries.

Example 2

Figure 5:
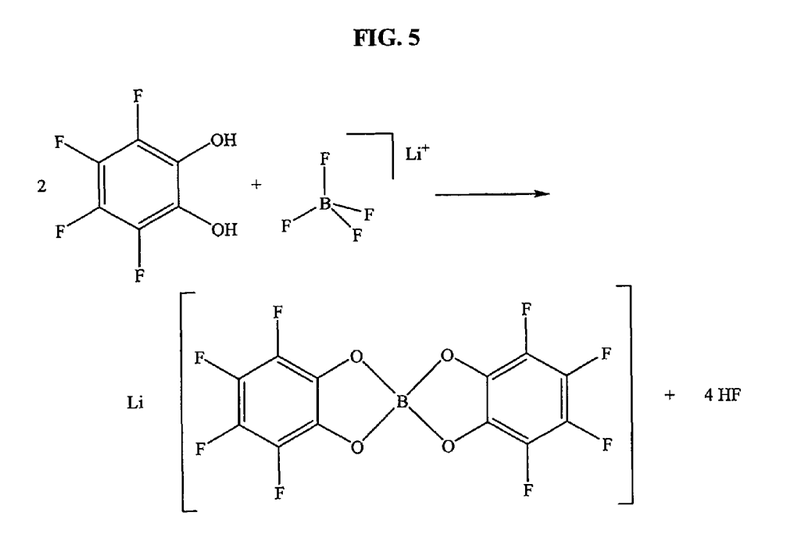
FIG. 5 is reaction for synthesis of lithium bis(tetrafluoro-1,2-benzenediolato) borate (LiBTFBDB).
Figure 6:
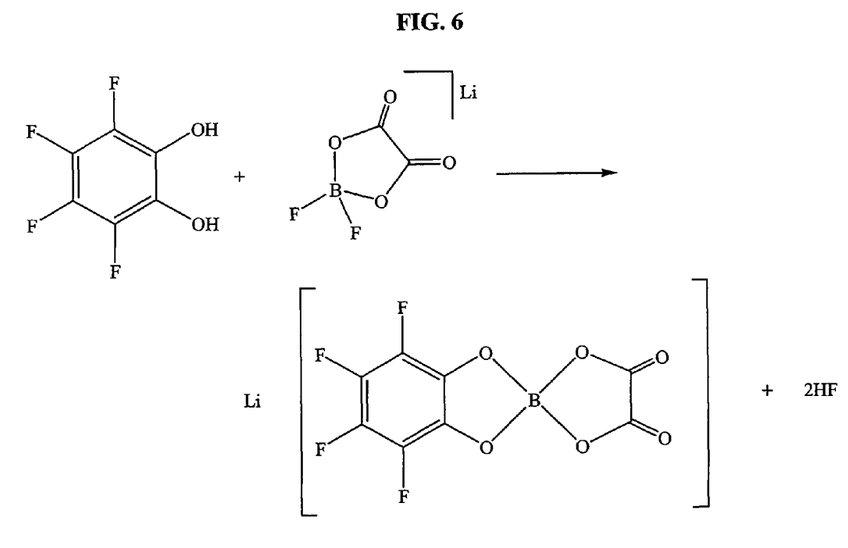
FIG. 6 is reaction for synthesis of lithium oxalato(tetrafluoro-1,2-benzenediolato) borate (LiOTFBDB).

Synthesis of lithium bis(tetrafluoro-1,2-benzenediolato) borate. In a glove box having an atmosphere of a dew point of −50° C., lithium tetrafluoroborate (LiBF$_4$, 0.0937 g, 1.0 mmol) and 3,4,5,6-tetrafluoro-1,2-dihydroxybenzene (0.3642 g, 2.0 mmol) were dissolved in dry acetonitrile (10 ml) in a 25 ml round bottom flask. SiCl$_4$ (0.188 g, 1.1 mmol) was then gradually added to the solution. With stirring, the solution was heated to 60° C. and the temperature maintained at for 6 h. The acetonitrile was then removed by rotary evaporation. The resulting solid was washed with diethyl ether (10 ml) and dried at 110° C. for 24 h in vacuo (0.2 mbar), to yield lithium bis(tetrafluoro-1,2-benzenediolato)borate (0.370 g, 98%). The synthetic route is illustrated in FIG. 5.

Figure 2:
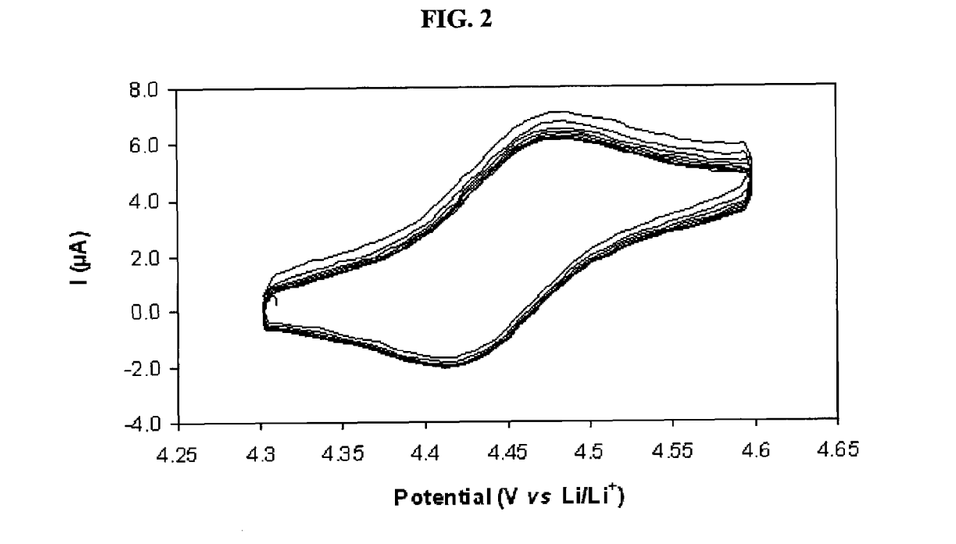
FIG. 2 is a cyclic voltammogram of 1.0 M $LiPF_6$ in EC/PC/DEC (1:1:3) with 2.0 wt % lithium bis(tetrafluoro-1,2-benzenediolato) borate (LiBTFBDB) using a three electrode system (Pt working Electrode, Li counter electrode and Li reference electrode).

FIG. 2 shows the cyclic voltammogram of an electrolyte of 1.0 M LiPF$_6$ in EC/PC/DEC (1:1:3) with 2.0 wt % lithium bis(tetrafluoro-1,2-benzenediolato)borate using a three electrode system. The oxidation reaction was triggered at about 4.43 V vs. Li, and the oxidation current peaks at 4.48-4.50 V vs. Li. In case of overcharging, the reduction reaction occurs at the negative electrodes, whose potential is always around 0 V vs. Li (<<4.43 V). Therefore, lithium bis(tetrafluoro-1,2-benzenediolato)borate is also capable of protecting lithium-ion batteries from being overcharged.

Example 3

Synthesis of lithium oxalato(tetrafluoro-1,2-benzenediolato)borate. In a glove box having an atmosphere of a dew point of −50° C., lithium tetrafluoroborate (LiBF$_4$, 0.137 g, 1.46 mmol), 3,4,5,6-tetrafluoro-1,2-dihydroxybenzene (0.265 g, 1.45 mmol), oxalic acid (0.131 g, 1.45 mmol) were dissolved in dry acetonitrile (15 ml) in a 25 ml round bottom flask. SiCl$_4$ (0.275 g, 1.62 mmol) was then gradually added to the solution. With stirring, the solution was heated to 60° C. and the temperature maintained for 6 h. The acetonitrile was then removed by rotary evaporation. The resultant solid was washed with diethyl ether (10 ml), and then dried in vacuo for 24 h (0.1 mbar) to yield lithium oxalato(tetrafluoro-1,2-benzenediolato)borate (0.51 g, yield 95%).

Figure 3:
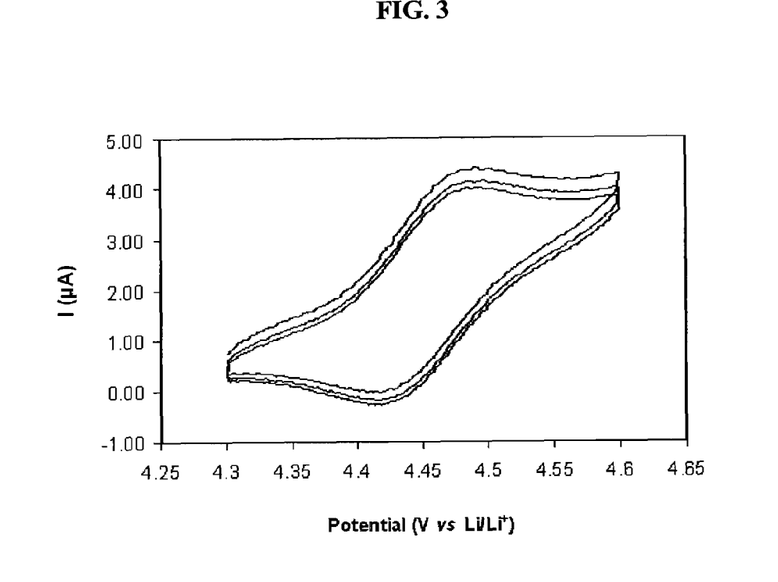
FIG. 3 is a cyclic voltammogram of 1.0 M $LiPF_6$ in EC/PC/DEC (1:1:3) with 1.5 wt % lithium oxalato(tetrafluoro-1,2-benzenediolato) borate (LiOTFBDB) using a three electrode system (Pt working Electrode, Li counter electrode and Li reference electrode).
Figure 4:
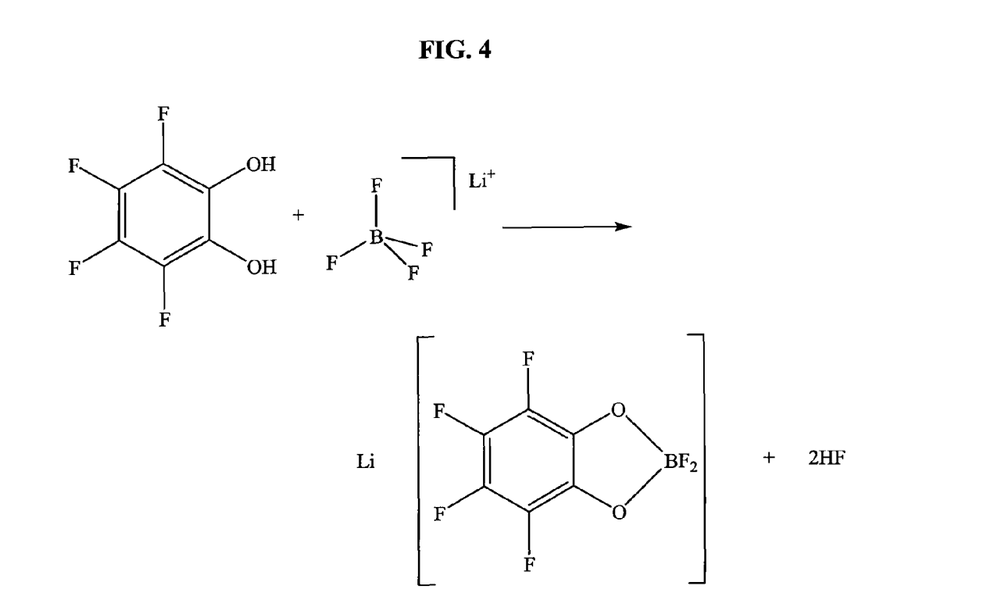
FIG. 4 is reaction for synthesis of lithium (difluorotetrafluoro-1,2-benzenediolato) borate (LiDfTFBDB).

FIG. 3 is a cyclic voltammogram of 1.0 M LiPF$_6$ in EC/PC/DEC (1:1:3) with 1.5 wt % lithium oxalate(tetrafluoro-1,2-benzenediolato) borate using a three electrode system. One pair of reversible peaks at about 4.42-4.50 V vs. Li is therefore assigned to the redox reaction of the exemplary lithium salt.

While some embodiments have been illustrated and described, it should be understood that changes and modifications can be made therein in accordance with ordinary skill in the art without departing from the invention in its broader aspects as defined in the following claims.

We claim:

1. An electrolyte comprising:
   an aprotic solvent; and
   a metal complex salt;
   wherein the metal complex salt is a complex of Formula (I), Formula (II), Formula (III), Formula IV, a diastereomer any of Formulas I, II, III, or IV thereof, or a mixture of any two or more thereof:

(Formula I)

(Formula II)

(Formula III); and further wherein;
A is Al;
A' is P or As;
each Z is independently O or S;
each X' is independently H, halogen, CN, NO$_2$, alkyl, or haloalkyl;
M is an electrochemically stable cation;
x is 1, 2, or 3;

$R^5$, $R^6$, $R^7$ and $R^8$ are individually a halogen; an unsubstituted or substituted alkyl group; an unsubstituted or substituted alkyl group; a unsubstituted or substituted haloalkyl group; an unsubstituted or substituted aryl group; a unsubstituted or substituted haloaryl group; a cyano group; or a nitro group; or two of $R^5$, $R^6$, $R^7$ and $R^8$, or two pairs of $R^5$, $R^6$, $R^7$ and $R^8$, join together as a group of Formula V;

(Formula V)

wherein $R^9$ is absent, or is a $C_1$-$C_{10}$ alkyl, $C_1$-$C_{10}$ haloalkyl, $C_6$-$C_{20}$ aryl, or $C_6$-$C_{20}$ haloaryl.

2. The electrolyte of claim 1, wherein the metal complex salt is a lithium salt.

3. The electrolyte of claim 1, wherein the metal complex salt exhibits a reversible oxidation/reduction reaction at a potential from about 3 V and 5.5 V.

4. The electrolyte of claim 1, wherein the potential is from about 3.9 V and 4.8 V.

5. The electrolyte of claim 1, wherein the electrochemically stable cation is an alkaline earth metal ion, alkali metal ion, ammonium ion, alkyl ammonium ion, tetraalkylammonium ion, imidazolium ion, or a mixture of any two or more thereof.

6. The electrolyte of claim 1, wherein M is Na, K, Ca, Mg, $NH_4$, $NMe_4$, or $NEt_4$.

7. The electrolyte of claim 1, wherein A' is P.

8. The electrolyte of claim 1, wherein each X' is F.

9. The electrolyte of claim 1, wherein each Z is O.

10. The electrolyte of claim 1, wherein in Formula I, $R^5$ and $R^6$ are individually a halogen.

11. The electrolyte of claim 10, wherein $R^5$ and $R^6$ are both F.

12. The electrolyte of claim 1, wherein in Formula I, $R^7$ and $R^8$ are individually a halogen.

13. The electrolyte of claim 1, wherein $R^5$ and $R^6$, together form an group of Formula V, wherein Z is O and $R^9$ is absent, $CH_2$, CFH, or $CF_2$.

14. The electrolyte of claim 1, wherein $R^7$ and $R^8$, together form an group of Formula V, wherein Z is O and $R^9$ is absent, $CH_2$, CFH, or $CF_2$.

15. The electrolyte of claim 1, wherein the metal salt complex is a complex of Formula VI, VII, VIII, a diastereomer thereof, or a mixture of any two or more thereof:

(Formula VI)

(Formula VII)

(Formula VIII)

16. An electrolyte comprising:
an aprotic solvent; and
a metal complex salt;
wherein the metal complex salt comprises:

LiOTFBDB

LiDfMTFBDB

LiDfTBBDB

LiBTBBDB

LiDfBTBBDB

LiBTBBDB or a regioisomer thereof, or a mixture of any two or more thereof.

17. An electrolyte comprising:
an aprotic solvent; and
a metal complex salt;
wherein the metal complex salt comprises:

or a regioisomer, or a mixture of any two or more thereof.

18. The electrolyte of claim 1, further comprising an additional lithium salt.

19. The electrolyte of claim 18, wherein the additional lithium salt is selected from $Li[PF_2(C_2O_4)_2]$, $Li[SO_3CF_3]$, $Li[N(CF_3SO_2)_2]$, $Li[C(CF_3SO_2)_3]$, $Li[N(SO_2C_2F_5)_2]$, $LiClO_4$, $LiPF_6$, $LiAsF_6$, $LiBF_4$, $LiB(C_6F_5)_4$, $LiB(C_6H_5)_4$, $Li[B(C_2O_4)_2]$, $Li[BF_2(C_2O_4)]$, or a mixture of any two or more thereof.

20. The electrolyte of claim 1, wherein the aprotic solvent is ethylene carbonate, dimethyl carbonate, ethyl methyl carbonate, diethyl carbonate, methyl propyl carbonate, methyl trifluoroethyl carbonate, dimethoxyethane, diglyme, and triglyme, propylene carbonate, trifluoropropylene carbonate, chloroethylene carbonate, vinylene carbonate, butylene carbonate, dimethylvinylene carbonate, a polyethylene glycol, a sulfone, a polyether, a polyethylene oxide, a polyimide, a polyphosphazine, a polyacrylonitrile, a polysiloxane, a sulfonated polyimide, a perfluorinated membrane, a divinyl polyethylene glycol, a polyethylene glycol-bis-(methyl acrylate), a polyethylene glycol-bis(methyl methacrylate), a polyether grafted polysiloxane, an aprotic gel polymer, or a mixture, blend, or co-polymers of any two or more thereof.

21. An electrochemical device comprising: a positive electrode, a negative electrode and the electrolyte of claim 1.

22. The electrochemical device of claim 21, wherein the aprotic solvent is ethylene carbonate, dimethyl carbonate, ethyl methyl carbonate, diethyl carbonate, methyl propyl carbonate, methyl trifluoroethyl carbonate, dimethoxyethane, diglyme, and triglyme, propylene carbonate, trifluoropropylene carbonate, chloroethylene carbonate, vinylene carbonate, butylene carbonate, dimethylvinylene carbonate, a polyethylene glycol, a sulfone, a polyether, a polyethylene oxide, a polyimide, a polyphosphazine, a polyacrylonitrile, a polysiloxane, a sulfonated polyimide, a perfluorinated membrane, a divinyl polyethylene glycol, a polyethylene glycol-bis-(methyl acrylate), a polyethylene glycol-bis(methyl methacrylate), a polyether grafted polysiloxane, an aprotic gel polymer, or a mixture, blend, or co-polymers of any two or more thereof.

23. The electrochemical device of claim 21, wherein:
the positive electrode comprises a spinel, an olivine, a carbon-coated olivine, $LiFePO_4$, a $Li_xM'_yM''_zPO_4$, $Li_{1+x''}Ni_\alpha Mn_\beta Co_\gamma Met'_\delta O_{2-z''}F_{z''}$, $A_{n''}B_2(XO_4)_3$, vanadium oxide, and mixtures of any two or more thereof; and
M' is selected from the group consisting of V, Cr, Mg, Fe, Co, and Ni;
M" is selected from group consisting of IIA, IIIA, WA, VA, VIA and IIIB metals having an ionic radius less than the ionic radius of $Fe^{2+}$;
Met' is selected from the group consisting of Mg, Zn, Al, Ga, B, Zr, and Ti; and $0 \leq x \leq 1$, $0 \leq y \leq 1$, $0 \leq z \leq 1$, $0 \leq x'' \leq 0.4$, $0 \leq \alpha \leq 1$, $0 \leq \beta \leq 1$, $0 \leq \gamma \leq 2$, $0 \leq \delta \leq 0.2$, $0 \leq z'' \leq 0.5$, and $0 \leq n'' \leq 3$.

24. The electrochemical device of claim 21, wherein
the negative electrode comprises graphite, amorphous carbon, $Li_4Ti_5O_{12}$, $M_{1-x}A_xLi_{2-y}B_yTi_{6-z}C_zO_{14-t}Q_t$, tin alloys, silicon alloys, intermetallic compounds, lithium metal, or mixtures of any two or more such materials; and
M is selected from the group consisting of Ba, Sr, Ca, Mg, Pb, and Sn; $0<x \leq 0.5$, $0<y \leq 0.5$, $0<z \leq 0.5$, $0<t \leq 0.5$;
each of A, B and C are independently at least one divalent, trivalent or tetravalent metal; and
Q is a monovalent or divalent anion.

25. The electrochemical device of claim 21, wherein the electrochemical device is a, wherein the device is a lithium secondary battery or a super capacitor.

26. The electrochemical device of claim 21, wherein the positive electrode and the negative electrode are independently carbon black, graphite, amorphous carbon, soft carbon, carbon fiber, metal oxide nanostructure, or a mixture of any two or more thereof.

27. The electrochemical device of claim 21, wherein the electrochemical device is an asymmetrical capacitor and wherein the positive electrode and the negative electrode are independently carbon, lithiated carbon, $Li_4Ti_5O_{12}$, lithiated $Li_4Ti_5O_{12}$, $MnO_2$, $LiMn_2O_4$ and a mixture of two or more thereof.

28. The electrolyte of claim 16, wherein the metal complex salt is a lithium salt.

29. The electrolyte of claim 16, wherein the polar aprotic solvent comprises dimethyl carbonate, ethyl methyl carbonate, diethyl carbonate, methyl propyl carbonate, ethyl propyl carbonate, ethylene carbonate, propylene carbonate, dipropyl carbonate, bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, methyl propionate, butyl propionate, ethyl propionate, sulfolane, 1,2-dimethoxyethane, 1,2-diethoxyethane, tetrahydrofuran, 1,3-dioxolane, 4-methyl-1,3-dioxolane dimethoxyethane, triglyme, dimethylvinylene carbonate, tetraethyleneglycol, dimethyl ether, polyethylene glycols, sulfones, and gamma-butyrolactone, vinylene carbonate, chloroethylene carbonate, methyl butyrate, ethyl butyrate, ethyl acetate, gamma-valerolactone, ethyl valerate, 2-methyl-tetrahydrofuran, 3-methyl-2-oxazolidinone, 1,3-dioxolane, 4-methyl-1,3-dioxolane, vinylethylene carbonate, or 2-methyl-1,3-dioxolane.

30. The electrolyte of claim 16, further comprising an additional lithium salt.

31. The electrolyte of claim 30, wherein the additional lithium salt comprises $Li[PF_2(C_2O_4)_2]$, $Li[SO_3CF_3]$, $Li[N(CF_3SO_2)_2]$, $Li[C(CF_3SO_2)_3]$, $Li[N(SO_2C_2F_5)_2]$, $LiClO_4$, $LiPF_6$, $LiAsF_6$, $LiBF_4$, $LiB(C_6F_5)_4$, $LiB(C_6H_5)_4$, $Li[B(C_2O_4)_2]$, $Li[BF_2(C_2O_4)]$, or a mixture of any two or more thereof.

* * * * *

UNITED STATES PATENT AND TRADEMARK OFFICE
CERTIFICATE OF CORRECTION

PATENT NO. : 8,283,074 B2
APPLICATION NO. : 12/192452
DATED : October 9, 2012
INVENTOR(S) : Khalil Amine, Zhengcheng Zhang and Zonghai Chen It is certified that error appears in the above-identified patent and that said Letters Patent is hereby corrected as shown below:

In Column 26, Claim 23, Line 40, change "WA" to --IVA--.

Signed and Sealed this
Twenty-sixth Day of February, 2013

Teresa Stanek Rea
*Acting Director of the United States Patent and Trademark Office*